Patented Mar. 19, 1940

2,194,363

UNITED STATES PATENT OFFICE 2,194,363

PREPARATION OF PROPIOLIC ACID AND ITS HOMOLOGUES

Alexander Douglas Macallum, Niagara Falls, N. Y., assignor to E. I. du Pont de Nemours & Company, Wilmington, Del., a corporation of Delaware No Drawing. Application August 17, 1938, Serial No. 225,485

4 Claims. (Cl. 260—533)

This invention relates to a process for preparing propiolic acid and its homologues, more particularly to a process for preparing propiolic acid from alkali metal acetylides and carbon dioxide under pressure.

It it known that propiolic acid can be prepared by different methods, the most usual one starting from sodium acetylide. Thus sodium propiolate has been prepared by reacting solid sodium acetylide alone or diluted with sand by treatment with carbon dioxide under pressure. However, the yields obtained with any of these known processes have not been satisfactory, so that propiolic acid has not to date been available as a cheap starting material for industrial chemical synthesis. The homologues of propiolic acid are produced by analogous procedures and mostly give more satisfactory yields. These homologues, however, are of less practical importance and have not found any wide application in the chemical industry.

An object of the present invention is to provide an improved process for preparing propiolic acid and its homologues from alkali metal acetylides and their homologues. Further objects will be apparent from the following description of the invention.

My invention is based on the discovery that in the reaction of alkali metal acetylides with carbon dioxide the distribution of the acetylide and its surface properties are of primary importance. The use of a certain type of reaction medium for this reaction is only of secondary influence on the reaction. However, I have found that dry hydrocarbons are especially suitable as reaction media for this reaction; more particularly, purified kerosene offers a cheap and highly active reaction medium.

I have found that by replacing the reaction medium in which the alkali metal acetylide has been formed by such a hydrocarbon solvent, the alkali metal acetylide is obtained in an especially reactive form for subsequent treatment with carbon dioxide. My invention more particularly consists in preparing the alkali metal acetylides or their homologues in liquid ammonia, adding to this mixture the reaction medium to be used for the carbon dioxide treatment, and only then eliminating the ammonia from this mixture. Alternatively, the ammonia mixture can be added to the reaction medium to be used for the carbon dioxide treatment and the ammonia eliminated prior to this treatment. In such a mixture of the alkali metal acetylide with the reaction medium, the acetylide is present in a very reactive form. Thus, for example, in the preparation of sodium propiolate yields of over 90% can be easily obtained from such a reactive form of acetylide.

It has been further found that sodium acetylide which is especially suitable for the improved process of my invention may be prepared by reacting sodium and liquid ammonia in the presence of an iron oxide catalyst and reacting the resulting suspension of sodamide in liquid ammonia with dry gaseous acetylene.

In carrying out the process of my invention, the ammonia is eliminated from the mixture of the alkali metal acetylide and liquid ammonia by adding this mixture to or adding to this mixture a dry hydrocarbon solvent such as previously purified kerosene and thereafter or simultaneously evaporating the ammonia. The evaporation of the ammonia can be carried out at ordinary pressure or at reduced pressure, and generally it is advantageous to eliminate the last traces of ammonia under reduced pressure. Although total elimination is not absolutely necessary, it has been found that ammonia in any quantity has an unfavorable influence on the reaction, and for optimum results the ammonia should be almost entirely eliminated.

It is not necessary that the alkali metal acetylide suspension in kerosene, prepared as described above, should be given any special treatment, such as milling, in order to get the subsequent reaction with carbon dioxide to go to near completion. It is an advantage, however, to carry out the carbon dioxide treatment with effective stirring, as in a stationary autoclave, or, where the autoclave is set up on a shaking machine, to add a few metal balls, preferably steel shot, to the charge in order to break up, more quickly than would otherwise occur, any spongy lump or crusts of the acetylide. Effective stirring or shaking of the charge to be accomplished in this way tends also to dissipate the heat of reaction more uniformly so that danger of a runaway reaction, leading at higher temperatures to an explosive production of carbonate, carbon, carbon monoxide, and hydrogen as by-products can be entirely avoided in this way.

The mixture of kerosene or another dry hydrocarbon with the alkali metal acetylides such as, for example, sodium acetylide or a homologue which has been prepared in the above described manner can then be reacted with carbon dioxide in the conventional way, for example under a pressure of above 600 lbs. per sq. in., preferably at a pressure of about 800 to 900 lbs. per sq. in.

However, this step of the process is not an essential part of my invention and my invention is not restricted to any particular pressure in the carbon dioxide treatment step.

Any of the known dry hydrocarbon solvents can be used as a reaction medium for the carbon dioxide treatment of the acetylides, but I prefer to use purified kerosene such as the so-called "Deo-Base" kerosene. I have found that this type of highly purified kerosene is not only a cheap but also the most effective reaction medium for this reaction. When using other reaction media such as, for example, benzene or, better, toluene or xylene, care should be taken that these materials are in a very dry condition.

My invention is further illustrated in the following example.

Example

To 2 litres of liquid ammonia at a temperature of about −60° C., 0.9 gram of finely powdered, hydrated ferric nitrate is added and the mixture is stirred to dissolve the salt. Then a 2 gram quantity of sodium metal is added and the mixture is again stirred for a short period of time. Dry air is blown into the mixture for about 15 minutes until the blue solution has turned brown or black. The iron oxide catalyst mixture prepared in this way is now brought under a nitrogen atmosphere and the temperature raised to −35° C. At this point the main charge of sodium metal is introduced into the mixture to form sodamide: thus 97 grams of sodium are added to the mixture under continuous stirring and the reaction allowed to proceed for about 40 minutes or more until no more hydrogen gas is evolved and the reaction mixture has bleached out.

To prepare sodium acetylide from this mixture, the mixture is again cooled to −55° C. and about 90 litres of purified dry acetylene are introduced into the mixture at a rate of about 2 litres per minute.

To the mixture thus obtained, 500 cc. of "Deo-Base" kerosene are added, and stirring is continued until the ammonia has nearly all evaporated away. The last of the ammonia is then sucked off by evacuating and the slush of acetylide and kerosene transferred to and washed into a high pressure steel autoclave with the aid of about 500 cc. more of the kerosene.

The autoclave is now closed and evacuated and filled with carbon dioxide at about 20 pounds per sq. in. pressure. The autoclave is shaken and the pressure gradually increased so that hardly any heat evolution is noticeable. It is an advantage not to let the temperature of the charge exceed 50° C. The pressure is raised from 20 to 800 lbs. in about 3 hours and then maintained at 800 lbs. from 8 to 40 hours or until the unchanged acetylide in the acetylide-propiolate mixture has been decreased to as little as 1 to 2%. The propiolic acid can be isolated from the crude sodium propiolate obtained according to this procedure by dissolving the propiolate salt in distilled water, acidifying this solution with sulfuric acid, saturating the solution with ammonium sulfate and extracting the propiolic acid with ethyl acetate or ether or by another procedure, such as by distillation. The yield of organic acid so obtained may be as high as 90% or more.

The invention, however, is not restricted to the specific procedure of the example, and various other ways of carrying out the process of my invention will be apparent to any skilled chemist.

The preparation of the sodamide-forming catalyst from ferric nitrate and the procedure employed in making the sodium acetylide are not objects of my invention, but only form part of my preferred form of carrying out the process of my invention. Other alkali metals than sodium can be used, although sodium is the most convenient raw material for the process of my invention. Also, although my invention is especially useful for preparing propiolic acid from alkali metal acetylide, the same method may advantageously be used to prepare other acetylenic acids, starting from various acetylenic hydrocarbons. For example, the salts of tetrolic or methyl propiolic acid ($CH_3-C{\equiv}C-COOH$) may be prepared by carboxylating an alkali metal methyl acetylide in the same way. The various other homologues of acetylene, e. g., ethyl acetylene, propyl acetylene, butyl acetylene and the like, likewise may be converted to the corresponding acetylenic acid salts. In the appended claims, the generic terms: "acetylene homologues," "acetylide homologues," and propiolic acid homologues" include the specific compounds acetylene and propiolic acid as the first members of the homologous series indicated. My invention, however, is to be understood in its broad scope as defined in the appended claims.

I claim:

1. The process for preparing an acetylenic acid comprising preparing an alkali metal acetylide homologue in liquid ammonia, mixing with the mixture of liquid ammonia and said acetylide homologue a dry, liquid, inert hydrocarbon, evaporating the ammonia from said mixture to produce a mixture of said acetylide homologue and said hydrocarbon and thereafter reacting the resulting mixture with carbon dioxide.

2. The process for preparing propiolic acid comprising preparing an alkali metal acetylide in liquid ammonia, mixing with the mixture of liquid ammonia and said acetylide a dry, liquid, inert hydrocarbon, evaporating the ammonia from said mixture to produce a mixture of said acetylide and said hydrocarbon and thereafter reacting the resulting mixture with carbon dioxide.

3. The process for preparing propiolic acid by reacting sodium acetylide with carbon dioxide which comprises preparing sodium acetylide in liquid ammonia by reacting sodamide and acetylene, mixing with the resulting mixture of liquid ammonia and sodium acetylide a dry hydrocarbon selected from the group consisting of toluene, xylene, and purified kerosene, evaporating the ammonia from said mixture and thereafter reacting the resulting mixture with carbon dioxide at a pressure above about 600 lbs. per sq. in.

4. The process for preparing propiolic acid by reacting sodium acetylide and carbon dioxide which comprises first preparing sodamide by the reaction of sodium and liquid ammonia in the presence of an iron oxide catalyst prepared from hydrated ferric nitrate, treating the thus prepared sodamide-ammonia solution and suspension with acetylene, mixing purified kerosene with the resulting mixture of liquid ammonia and sodium acetylide, evaporating from this mixture the ammonia and thereafter reacting the resulting mixture of kerosene and sodium acetylide with carbon dioxide under a pressure of about 800 to 900 lbs. per sq. in.

ALEXANDER DOUGLAS MACALLUM.